(12) United States Patent
Kawanoue

(10) Patent No.: US 10,831,170 B2
(45) Date of Patent: Nov. 10, 2020

(54) CONTROL SYSTEM, CONTROL DEVICE, COUPLING METHOD, AND COMPUTER PROGRAM

(71) Applicant: OMRON Corporation, Kyoto (JP)

(72) Inventor: Shinsuke Kawanoue, Kyoto (JP)

(73) Assignee: OMRON Corporation, Kyoto (JP)

( * ) Notice: Subject to any disclaimer, the term of this patent is extended or adjusted under 35 U.S.C. 154(b) by 271 days.

(21) Appl. No.: 15/983,744

(22) Filed: May 18, 2018

(65) Prior Publication Data

US 2019/0004493 A1    Jan. 3, 2019

(30) Foreign Application Priority Data

Jun. 28, 2017 (JP) ................................. 2017-126208

(51) Int. Cl.
| | |
|---|---|
| *G05B 19/05* | (2006.01) |
| *G06F 16/2458* | (2019.01) |
| *G05B 19/042* | (2006.01) |
| *G06F 16/248* | (2019.01) |

(52) U.S. Cl.
CPC ....... *G05B 19/054* (2013.01); *G05B 19/0428* (2013.01); *G06F 16/248* (2019.01); *G06F 16/2465* (2019.01); *G06F 16/2471* (2019.01); *G06F 16/2474* (2019.01); *G06F 16/2477* (2019.01); *G05B 2219/1101* (2013.01); *G05B 2219/13144* (2013.01)

(58) Field of Classification Search
CPC ............... G05B 19/054; G06F 16/2477; G06F 16/2471; G06F 16/2465; G06F 16/2474; G06F 16/248

USPC .......................................................... 707/722
See application file for complete search history.

(56) References Cited

U.S. PATENT DOCUMENTS

| | | | | | |
|---|---|---|---|---|---|
| 5,590,319 | A | * | 12/1996 | Cohen | ............... G06F 16/24532 |
| 5,999,924 | A | * | 12/1999 | Bair | .................... G06F 16/2477 |
| | | | | | 707/700 |
| 6,456,234 | B1 | * | 9/2002 | Johnson | ............. G06Q 30/0277 |
| | | | | | 342/357.48 |

(Continued)

FOREIGN PATENT DOCUMENTS

| | | |
|---|---|---|
| JP | 2016-81316 A | 5/2016 |
| WO | 2017027179 A1 | 2/2017 |
| WO | 2017099772 A1 | 6/2017 |

OTHER PUBLICATIONS

Anonymous, "Caching Parallel Query engine for OpenTSDB", Sep. 15, 2016, XP55521668, Retrieved from the Internet:URL:https://github.com/turn/splicer [retrieved on Nov. 7, 2018].

(Continued)

*Primary Examiner* — Phuong Thao Cao
(74) *Attorney, Agent, or Firm* — Metrolex IP Law Group, PLLC

(57) ABSTRACT

An item for designating a time stamp accuracy is added to an inquiry syntax of a query. At the time of table coupling, a query designating the desired accuracy in the item is transmitted. This query is analyzed by a query parser, and individual queries are created for each database targeted for inquiry and transmitted. At the time of coupling acquired tables, the number of digits of the time stamps is adjusted to be the same in accordance with the designated accuracy, and the tables are coupled in chronological order of the time stamps.

16 Claims, 12 Drawing Sheets

(56) References Cited

U.S. PATENT DOCUMENTS

| | | | |
|---|---|---|---|
| 9,853,949 B1* | 12/2017 | Stickle | H04L 63/0428 |
| 2003/0055807 A1* | 3/2003 | Lomet | G06F 16/2477 |
| 2006/0022048 A1* | 2/2006 | Johnson | H04W 4/029 |
| | | | 235/462.1 |
| 2008/0104089 A1* | 5/2008 | Pragada | G06F 16/2471 |
| 2008/0147603 A1* | 6/2008 | Kostamaa | G06F 16/245 |
| 2008/0222089 A1* | 9/2008 | Stewart | G06F 16/24554 |
| 2008/0222104 A1* | 9/2008 | Stewart | G06F 16/285 |
| 2009/0043732 A1* | 2/2009 | Lee | G06F 16/951 |
| 2011/0113446 A1* | 5/2011 | Lockridge | H04H 20/63 |
| | | | 725/37 |
| 2011/0125778 A1* | 5/2011 | Kubo | G06F 16/24568 |
| | | | 707/769 |
| 2012/0221589 A1* | 8/2012 | Shahar | G06F 16/248 |
| | | | 707/758 |
| 2013/0115972 A1* | 5/2013 | Ziskind | H04W 4/21 |
| | | | 455/456.2 |
| 2013/0117257 A1* | 5/2013 | Meijer | G06F 16/2453 |
| | | | 707/719 |
| 2014/0241381 A1* | 8/2014 | Hamamatsu | H04L 7/0033 |
| | | | 370/508 |
| 2014/0277604 A1 | 9/2014 | Nixon et al. | |
| 2014/0289284 A1* | 9/2014 | Patterson | G06F 16/29 |
| | | | 707/805 |
| 2015/0032486 A1* | 1/2015 | Francois | G06Q 10/02 |
| | | | 705/5 |
| 2015/0254307 A1* | 9/2015 | Johnson | G06F 16/24554 |
| | | | 707/763 |
| 2015/0269968 A1* | 9/2015 | Matejka | G11B 27/102 |
| | | | 386/241 |
| 2015/0363603 A1* | 12/2015 | Hsu | G06F 16/9535 |
| | | | 707/783 |
| 2016/0301490 A1* | 10/2016 | Williams | H04L 29/0854 |
| 2016/0314185 A1* | 10/2016 | Buchanan | G06F 16/24578 |
| 2017/0041126 A1* | 2/2017 | Bergeron | H04L 43/0858 |
| 2017/0046384 A1* | 2/2017 | Di Blas | G06F 16/24534 |
| 2017/0052976 A1* | 2/2017 | Verma | G06F 16/24535 |
| 2017/0344609 A1* | 11/2017 | Wadley | G06F 16/24575 |
| 2018/0113900 A1* | 4/2018 | Beier | G06F 16/2329 |
| 2018/0167222 A1* | 6/2018 | Grajek | H04L 9/3297 |
| 2018/0293280 A1* | 10/2018 | Svec | G06F 16/24553 |
| 2018/0329942 A1* | 11/2018 | Kawanoue | G06F 16/2474 |
| 2019/0034813 A1* | 1/2019 | Das | G06N 5/022 |
| 2019/0303480 A1* | 10/2019 | Canis | G06N 20/00 |

OTHER PUBLICATIONS

Anonymous, "Welcome to OpenTSDB 2 Documentation for OpenTSDB 2.3—OpenTSDB2.3 documentation", Dec. 31, 2016, XP55521688, Retrieved from the Internet:URL:https://github.com/OpenTSDB/opentsdb/blob/master/NEWS [retrieved on Nov. 7, 2018].

Anonymous, "opentsdb / NEWS", Apr. 21, 2018,XP55521692, Retrieved from the Internet:URL:https://github.com/OpenTSDB/opentsdb/blob/master/NEWS [retrieved on Nov. 7, 2018].

The extended European search report dated Nov. 15, 2018 in a counterpart European Patent application.

* cited by examiner

SELECT * FROM PLC1.TS001 EX-JOIN PLC2.TS002
WHERE Time > 2017-03-04 AND LEVEL=1#ms
GROUP BY AVE

FIG. 10

| Time stamp | Data1 | Data2 |
|---|---|---|
| 2017-03-03-08:00:00.013 | 0.875 | 3.753 |
| 2017-03-03-08:00:00.014 | 0.995 | 3.587 |
| 2017-03-03-08:00:00.015 | 0.889 | 3.893 |
| 2017-03-03-08:00:00.015 | 0.994 | 3.499 |

FIG. 11

Embedded Database 102b (Table: TS001)

| Index | Time stamp | Data1 |
|---|---|---|
| 182 | 2017-03-03-08:00:00.0130 | 0.875 |
|  |  |  |
| 183 | 2017-03-03-08:00:00.0140 | 0.995 |
|  |  |  |
| 184 | 2017-03-03-08:00:00.0150 | 0.889 |
|  |  |  |
| 185 | 2017-03-03-08:00:00.0160 | 0.994 |
|  |  |  |

FIG. 12

Embedded Database 602b (Table: TS002)

| Index | Time stamp | Data2 |
|---|---|---|
| 202 | 2017-03-03-08:00:00.0130 | 3.753 |
| 203 | 2017-03-03-08:00:00.0135 | 3.751 |
| 204 | 2017-03-03-08:00:00.0140 | 3.587 |
| 205 | 2017-03-03-08:00:00.0145 | 3.589 |
| 206 | 2017-03-03-08:00:00.0150 | 3.891 |
| 207 | 2017-03-03-08:00:00.0155 | 3.895 |
| 208 | 2017-03-03-08:00:00.0160 | 3.499 |
| 209 | 2017-03-03-08:00:00.0165 | 3.499 |

(a)

| Time stamp | Data1 | Data2 |
|---|---|---|
| 2017-03-03-08:00:00.0135 | 0.875 | 3.752 |
| 2017-03-03-08:00:00.0145 | 0.995 | 3.588 |
| 2017-03-03-08:00:00.0155 | 0.889 | 3.893 |
| 2017-03-03-08:00:00.0155 | 0.994 | 3.499 |

```
SELECT * FROM PLC1.TS001 EX-JOIN PLC2.TS002
WHERE Time > 2017-03-04 AND LEVEL= AUTO
GROUP BY AVE
```

CONTROL SYSTEM, CONTROL DEVICE, COUPLING METHOD, AND COMPUTER PROGRAM

CROSS-REFERENCES TO RELATED APPLICATIONS

This application claims priority to Japanese Patent Application No. 2017-126208 filed Jun. 28, 2017, the entire contents of which are incorporated herein by reference.

FIELD

One or more embodiments relate to a control system applicable to FA (Factory Automation), for example.

BACKGROUND

PLCs (Programmable Logic Controllers) serving as an example of control devices have, in recent years, come to be provided with ultra high-speed CPUs (Central Processing Units) and mass memories. In view of this, for example, collecting various types of data related to controlled objects (sensors, servo motors, etc.) at a frequency in the order of msecs (milliseconds), assigning a time stamp, and storing the data in a time-series database embedded in a PLC is being considered.

A technology relating to data management is disclosed in JP 2016-81316A. A data recording device disclosed in JP 2016-81316A, when recording measurement data, records the measurement data to storage blocks individually allocated to combinations of at least a data series to which the measurement data belongs and a data type of the measurement data. According to this data recording device, measurement data whose data series and data type match are recorded in each storage block, and thus even if there is change in data type, the measurement data before the change can be kept stored in a data storage unit rather than being discarded. The measurement data before the change in data type can thereby be read out and distributed, and it will also be possible to view the measurement data before the change.

JP 2016-81316A is an example of background art.

The data type relates to the accuracy of data that can be recorded. In particular, if the cycle or frequency of data collection increases, it is necessary to also increase the accuracy of the time stamp that is assigned to the data. In other words, it is necessary to place a large number of significant figures after the decimal point of the time stamp.

However, the individual PLCs do not necessarily collect data with the same cycle. For example, there are cases where a PLC that collects data with a cycle in the order of msec and a PLC that collects data with a cycle in the order of μsec (microseconds) exist together in the same FA system. In this way, when the databases differ, the cycles of the time stamps that are attached to data may not match. This will be problematic when coupling data from a plurality of databases or when coupling tables extracted from a plurality of databases.

One or more aspects have been made in view of such circumstances, and an object thereof is to provide a control system, a control device, a coupling method and a computer program that are capable of coupling a plurality of databases after aligning the time stamp cycles of the data of the databases.

SUMMARY

In order to achieve the above object, means such as the following are employed.

A first mode is a control system that includes a first database configured to store data to which a time stamp is assigned and a control device, the control device including a second database configured to store data to which a time stamp is assigned, a creation unit configured to create a common query that includes an item for designating an accuracy of a time stamp, a query parser configured to analyze the common query and create a first individual query addressed to the first database and a second individual query addressed to the second database, a transmission unit configured to transmit the first individual query to the first database and the second individual query to the second database, and a coupling unit configured to process at least one of a time stamp of data returned from the first database in response to the first individual query and a time stamp of data returned from the second database in response to the second individual query, based on the accuracy designated by the common query, and couple the data returned from the first database and the data returned from the second database.

The common query includes an item for designating the accuracy of the time stamps. The common query is analyzed by the query parser, and a first individual query addressed to a first database and a second individual query addressed to a second database are created. The first individual query is transmitted to the first database, and data that depends on the first individual query is read out from the first database and returned. The second individual query is transmitted to the second database, and data that depends on the second individual query is read out from the second database and returned.

At least one of the time stamp of the data returned from the first database and the time stamp of the data returned from the second database is processed based on the accuracy designated by the common query. The data returned from the first database and the data returned from the second database are then coupled after processing the time stamps.

Because of such a configuration, it becomes possible, after processing the time stamps of the data acquired from different databases at a designated accuracy (e.g., at an accuracy desired by a user), to couple the data acquired from the databases. Accordingly, it becomes possible to couple databases regardless of the time stamp cycles.

A second mode is configured such that the coupling unit rounds down or rounds up digits of the time stamp that are smaller than the designated accuracy to digits of the designated accuracy to process the time stamp.

Because of such a configuration, processing for adjusting the number of digits of the time stamps to be the same can be implemented on a unified basis.

A third mode is configured such that the coupling unit converts the data from the database that returned the largest number of data into an average value per unit of time to align the number of data returned from the first database and the number of the data returned from the second database, and couples the data returned from the first database and the data returned from the second database.

Because of such a configuration, a plurality of data can be coupled after having adjusting the number of occurrences of the data per unit of time to be the same, even with respect to databases having different cycles of data collection, for example.

A fourth mode is configured such that the coupling unit converts the data from the database that returned the largest number of data into one of a largest value and a smallest value within a unit of time to align the number of data returned from the first database and the number of the data returned from the second database, and couples the data returned from the first database and the data returned from the second database.

Even with such a configuration, a plurality of data can be coupled after having adjusted the number of occurrences of the data per unit of time to be the same, with regard to a plurality of databases having different cycles of data collection, for example.

A fifth mode is configured such that the control system further includes a setting unit configured to set the accuracy, based on the time stamp of the data returned from the first database and the time stamp of the data returned from the second database, and the coupling unit processes at least one of the time stamp of the data returned from the first database and the time stamp of the data returned from the second database, on a basis of the accuracy set by the setting unit.

Because of such a configuration, the accuracy of the time stamps is set by a setting unit based on the time stamps of the plurality of returned data. Accordingly, a system having high flexibility can be constructed without needing to designate the accuracy in the transmission source of the query.

In other words, an item for designating the accuracy of the time stamps is added to the inquiry syntax of the query. At the time of table coupling, a query is generated that designates the desired accuracy of the user in this item. The query parser analyzes this query, creates a query for each database targeted for inquiry and transmits the created queries. At the time of coupling the acquired tables, the number of digits of the time stamps is then adjusted to be the same in accordance with the designated accuracy, and the tables are combined in chronological order of the time stamps.

Adopting this configuration enables data extracted from a plurality of time series databases to be coupled at any accuracy desired by the user. Also, at the time of coupling databases having different write cycles, the data of the database having the shorter time stamp cycle is converted into a feature amount (average, largest, smallest, etc.), in conformity with the database having the longer time stamp cycle. Accordingly, records having a short cycle can be appropriately collected.

According to one or more aspects, a control system, a control device, a coupling method and a computer program that are capable of coupling a plurality of databases after aligning the time stamp cycles of the data of the databases can be provided.

BRIEF DESCRIPTION OF THE DRAWINGS

FIG. 10 is a diagram illustrating an example of a coupled table.

FIG. 11 is a diagram illustrating another example of an embedded database.

FIG. 12 is a diagram illustrating another example of a table that is extracted from an embedded database.

FIG. 13 is a diagram illustrating another example of a common query according to one or more embodiments.

FIG. 14 is a diagram illustrating processing by an accuracy setting unit 101*f*.

DETAILED DESCRIPTION

Figure 1:
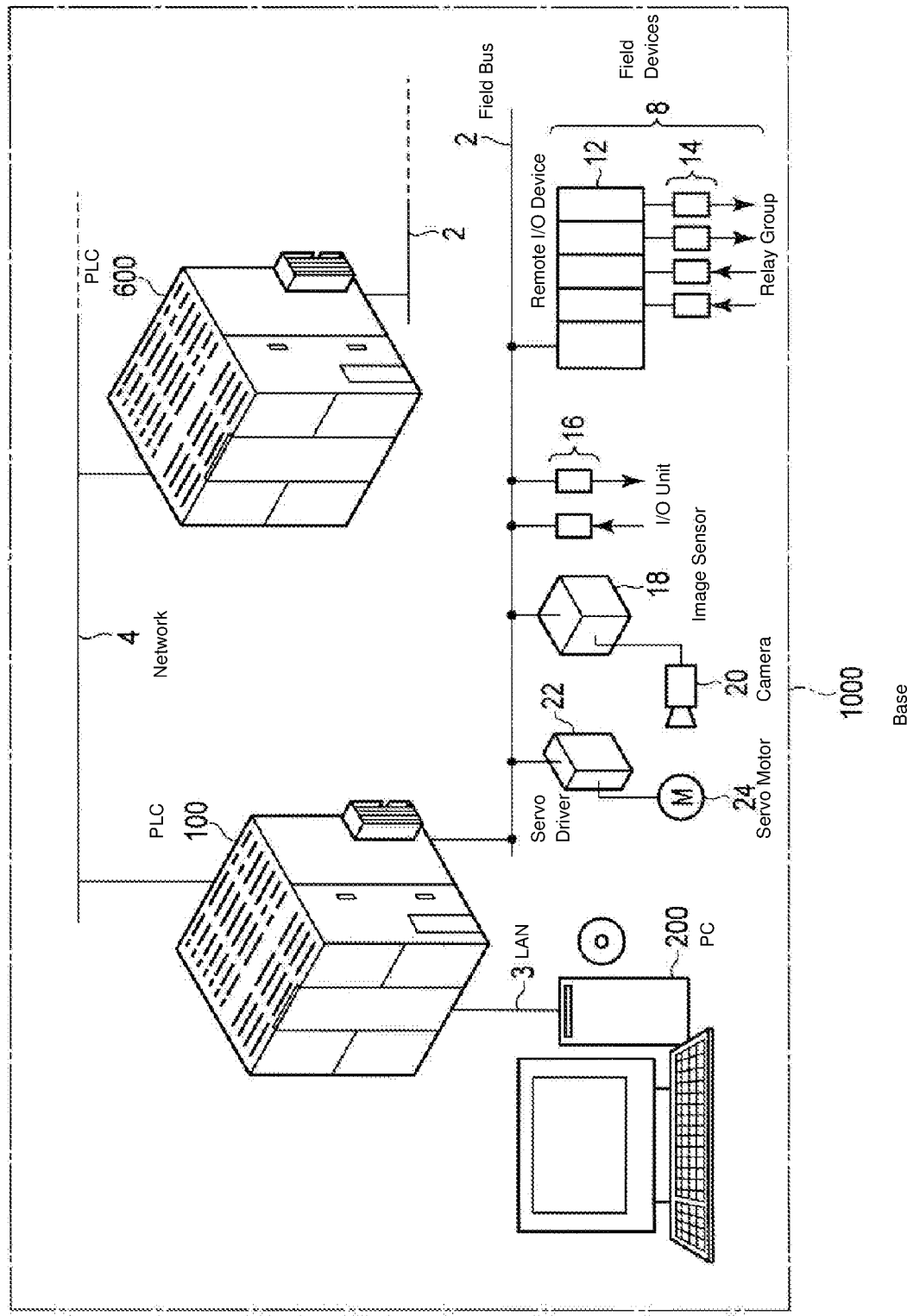
FIG. 1 is a diagram illustrating an example of a control system that includes control devices according to one or more embodiments.

FIG. 1 is a diagram showing an example of a control system that includes control devices according to one or more embodiments. The control system is installed in a base 1000 such as a factory or a distribution warehouse, for example. The control system is provided with a PLC 100 and a PLC 600 serving as an example of control devices and a computer (PC) 200 that is communicably connected to the PLC 100 via a LAN (Local Area Network) 3.

For example, it is possible for a computer program that includes commands for causing the PC 200 to execute functions or a method according to one or more embodiments to be installed on the PC 200 from a recording medium 30 such as a CD-ROM.

The PLC 100 is connected to a field bus 2 formed in the base 1000. A group 8 of field devices serving as examples of controlled objects is connected to the field bus 2. The group 8 of field devices includes a remote I/O (Input/Output) device 12, a relay group 14, an I/O unit 16, an image sensor 18, a camera 20, a servo motor driver 22 and a servo motor 24, for example. The field devices in this group 8 exchange various types of data related to control with the PLC 100 via the field bus 2. The PLC 100 stores the acquired data in an embedded database. That is, the PLC 100 collects data related to controlled objects in a cycle of milliseconds or microseconds, for example. Collected data is assigned a time stamp at the point in time of collection, for example, and is stored in an embedded time series database or the like.

A protocol capable of guaranteeing the arrival time of data is preferably employed for the field bus 2. Known networks that employ this type of protocol include EtherCAT(registered trademark), EtherNet(registered trademark)/IP, DeviceNet(registered trademark), and CompoNet(registered trademark).

The PLC 100 is further provided with an interface capable of connecting to another PLC (PLC 600). The PLC 600 is also likewise connected to a field bus 2, and controls a group 8 of field devices allocated separately from the PLC 100. A protocol such as EtherNet(registered trademark)/IP can also be applied to a network 4 that connects the PLC 100 and the PLC 600, for example.

Figure 2:
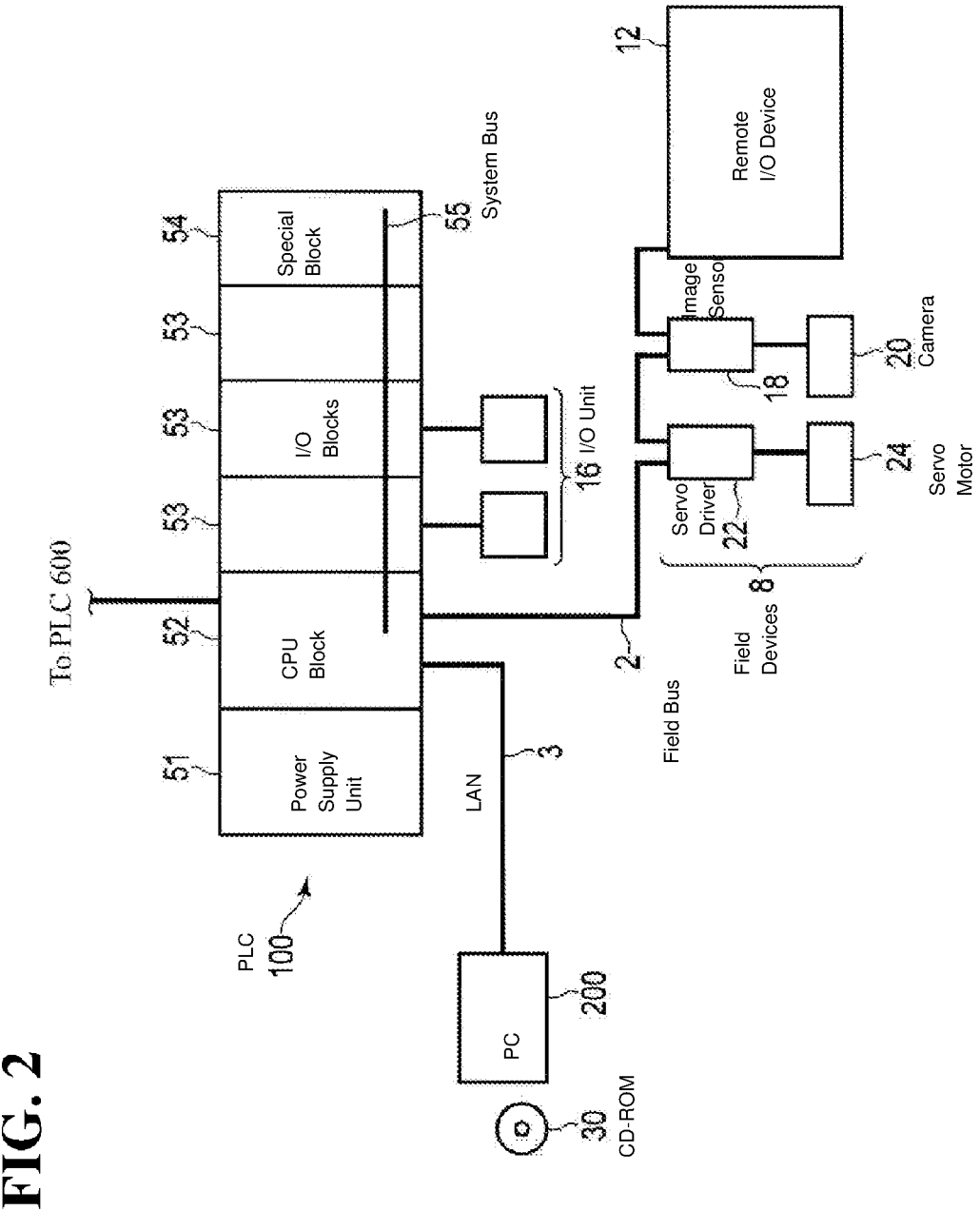
FIG. 2 is a schematic diagram illustrating an example of a form of a PLC according to one or more embodiments.

FIG. 2 is a schematic diagram showing an example of a form of the PLC 100 shown in FIG. 1. As an example, the PLC 100 that is shown is what is known as a building block PLC that combines a plurality of units. In addition, package PLCs and base mounted PLCs are also known.

The PLC 100 is provided with a power supply unit 51, a CPU block 52, a plurality of I/O blocks 53, and a special block 54. Of these, the CPU block 52, the I/O blocks 53 and the special block 54 are connected by a system bus 55 provided within the device. The I/O blocks 53 are connected to the I/O unit 16, and acquire various types of generated data from relays, detection switches and the like, and send the acquired data to the CPU block 52. These types of data related to control include a diverse range of data such as the torque of the servo motor 24, the conveyance speed of goods (workpieces) and the angle of a robot arm, for example. Such data is naturally not limited thereto.

The I/O unit 16 collects information indicating, for example, whether a sensor (detection switch, etc.) has detected an object or has not detected an object. This type of information can be represented in association with either ON or OFF. For example, a state in which the sensor has detected an object can be associated with ON and a state in which the sensor has not detected an object can be associated with OFF.

Also, the I/O unit 16 outputs either an instruction (ON) for activating or an instruction (OFF) for deactivating a relay, actuator or the like to the relay, actuator or the like serving as the destination.

Also, the I/O unit 16 transfers instruction values from the CPU block 52 for controlling the drive of the servo motor 24 to the servo motor driver 22 via the field bus 2. The servo motor driver 22 receives instruction values such as position instruction values, speed instruction values and torque instruction values from the PLC 100 in a constant cycle, for example.

Actual measurement values related to the operation of the servo motor 24, such as position, speed (typically, calculated from the difference between the current position the previous position) and torque, are acquired, using a position sensor (rotary encoder), a torque sensor and the like connected to the shaft of the servo motor 24. The conveyance speed of workpieces or the angle of a robot arm is directly derived from these sensing data or is computationally calculated.

The CPU block 52 is connected to the field bus 2 that leads to the field device group 8, and the LAN 3 that leads to the PC 200, and the network 4 that leads to the PLC 600. The CPU block 52 is provided with a CPU and functions as the core of the PLC 100.

Figure 3:
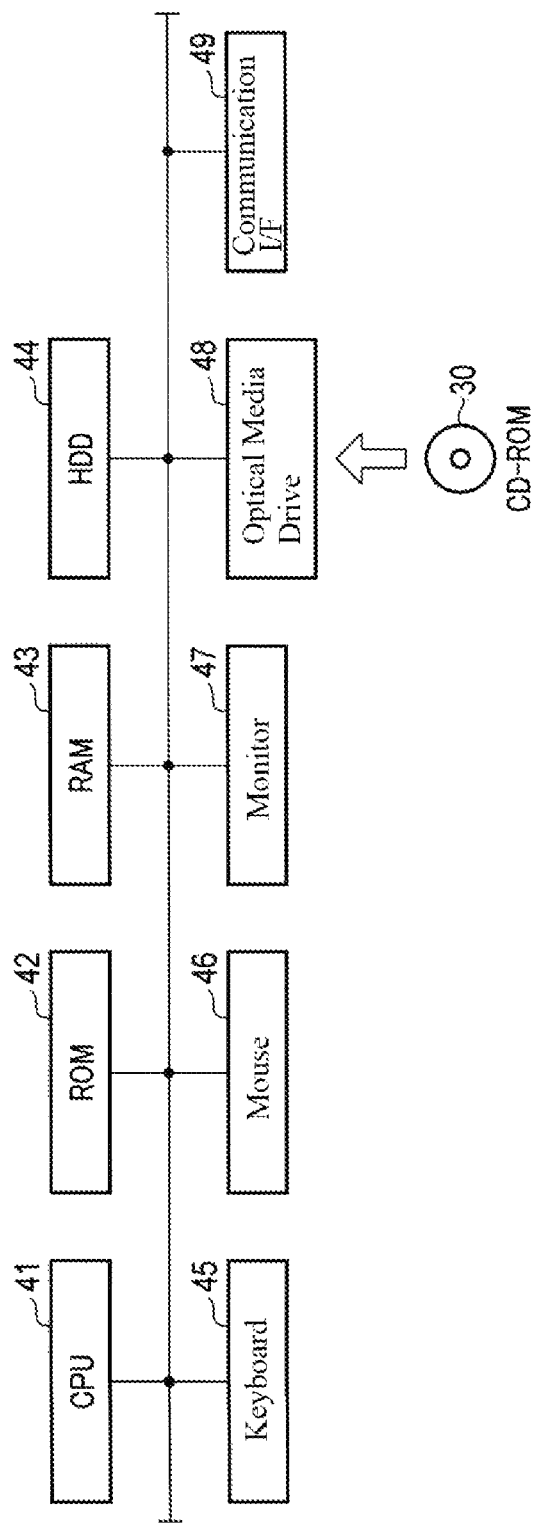
FIG. 3 is a block diagram illustrating an example of a hardware configuration of a PC.

FIG. 3 is a block diagram showing an example of a hardware configuration of the PC 200. The PC 200 is provided with a CPU 41, a ROM (Read Only Memory) 42, a RAM (Random Access Memory) 43, and a hard disk drive (HDD) 44. The CPU 41 corresponds to a computational unit of the PC 200. The ROM 42, the RAM 43 and the HDD 44 correspond to storage units of the PC 200.

The CPU 41 executes various computer programs including an OS (Operating System). The ROM 42 stores a BIOS (Basic Input Output System) and various data. The RAM 43 temporarily stores data and computer programs loaded from the HDD 44. The HDD 44 stores data and computer programs to be executed by the CPU 41.

The PC 200 is further provided with a keyboard 45, a mouse 46, a monitor 47, an optical media drive 48, and a communication interface (I/F) 49. The keyboard 45 and the mouse 46 accept operations from a user. The monitor 47 visually displays various types of information. The optical media drive 48 reads digital data recorded on a recording medium such as a CD-ROM 30. The communication I/F 49 is connected to the LAN 3 and communicates with the PLC 100.

Various computer programs to be executed by the PC 200 can be recorded to the CD-ROM 30, for example, and distributed. The computer programs stored on this CD-ROM 30 are read by the optical media drive 48, and stored on the HDD 44 or the like. Alternatively, a configuration may be adopted in which computer programs are downloaded through a network from a high level server computer or the like.

Figure 4:
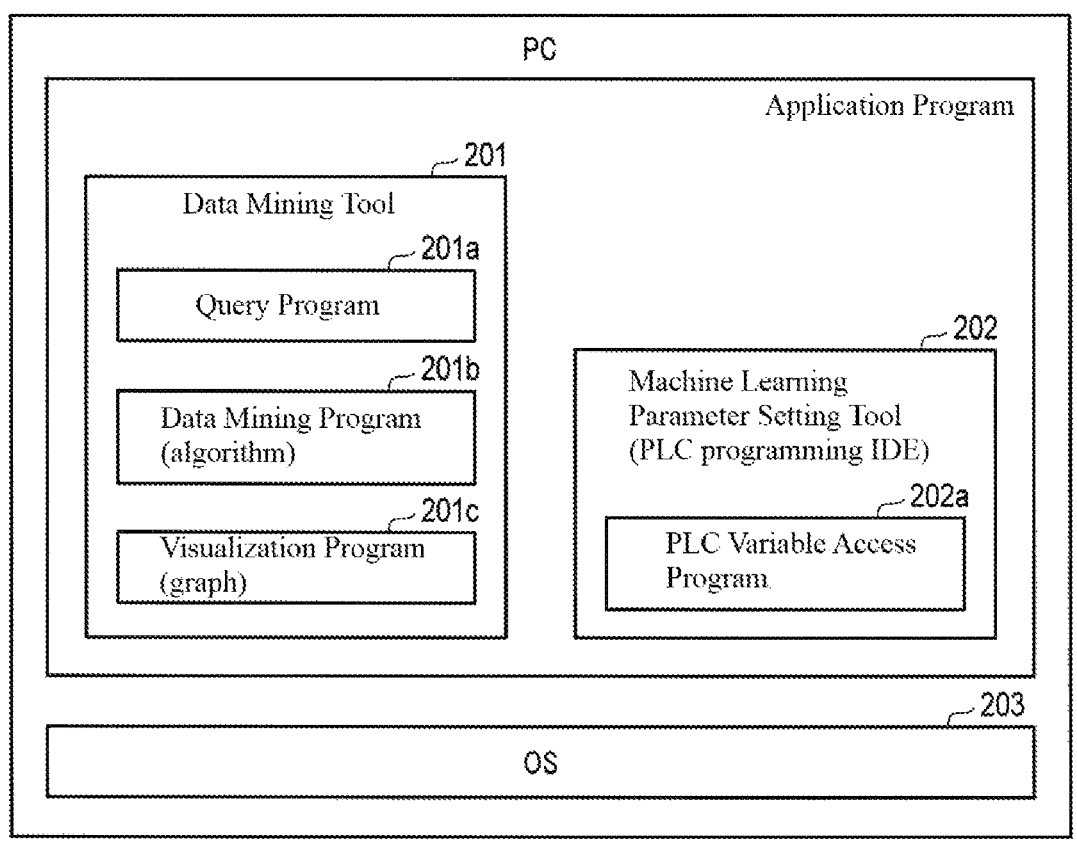
FIG. 4 is a block diagram illustrating an example of a software configuration of a PC.

FIG. 4 is a block diagram showing an example of a software configuration of the PC 200. The PC 200 is provided with a data mining tool 201 and a machine learning parameter setting tool 202. The data mining tool 201 and the machine learning parameter setting tool 202 are two of the application programs that operate under the control of an OS 203, for example. In other words, the PC 200 operates as the data mining tool 201 and the machine learning parameter setting tool 202, as a result of the CPU 41 interpreting and executing computer programs loaded to the RAM 43 from the HDD 44 (FIG. 3).

The data mining tool 201 is provided with a query program 201*a*, a data mining program 201*b*, and a visualization program 201*c*. The query program 201*a* creates queries for acquiring desired data from a time-series database. The data mining program 201*b* processes data acquired as a result of queries based on a predetermined algorithm, and performs processing such as prediction processing related to control. The visualization program 201*c* performs processing such as displaying the results of data processing on a graph, and serves as part of a human machine interface with a person. A GUI (Graphical User Interface) environment can thereby be utilized, even with a PLC that does not have a UI (User Interface).

Using these blocks, the data mining tool 201 executes processing such as determination of the feature amount in a query, determination of an anomaly detection technique, determination of machine learning parameters, or evaluation of anomaly detection results.

The machine learning parameter setting tool 202 is provided by an Integrated Development Environment (PLC programming IDE) for cross-developing computer programs for PLCs in compliance with IEC 61131-3, for example. The machine learning parameter setting tool 202 includes a PLC variable access program 202*a*. The PLC variable access program 202*a* accesses the PLC 100 and acquires various data (sensor data, data on the servo motor, etc.) mapped to variables.

Figure 5:
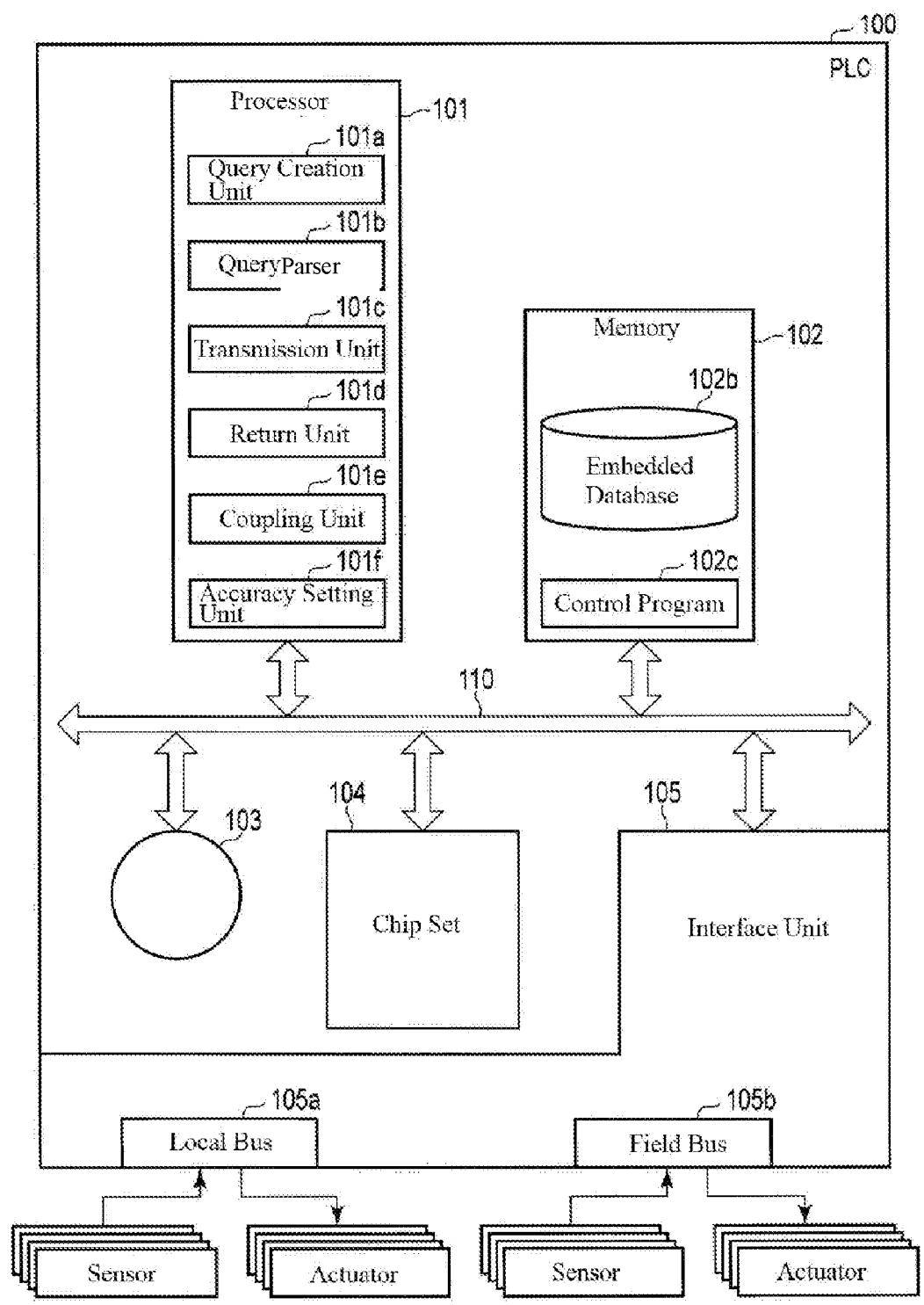
FIG. 5 is a functional block diagram illustrating an example of a PLC.

FIG. 5 is a functional block diagram showing an example of the PLC 100. Note that the PLC 600 is also similar. The PLC 100 is provided with a processor 101, a memory 102, a clock generator 103, a chipset 104 and an interface unit 105. These constituent elements are connected via an internal bus 110.

The clock generator 103 is a circuit that combines a crystal oscillator and a PLL (Phase Lock Loop), for example, and is configured to produce a highly accurate cyclic pulse. The PLC 100 uses this pulse signal as a local clock. The local clock defines the timing of computations, controls and the like inside the PLC 100. The local clock is also used as a basis of time stamps that are assigned to data. The chip set 104 prevents the collision of data on the internal bus 110, by controlling the timing of the exchange of data between the processor 101, the memory 102 and the interface unit 105.

The interface unit 105 is provided with a local bus 105*a* and a field bus 105*b*. The local bus 105*a* is an interface for relaying data that is exchanged between the PLC 100 and devices that are connected to this PLC 100. The local bus 105*a* acquires data from a connected sensor 81, and transmits a control signal to an actuator 82 that is a control target. Likewise, the field bus 105*b* is an interface for relaying data that is exchanged between the PLC 100 and devices that are connected to this PLC 100. The field bus 105*b* acquires data from a connected sensor 83, and sends a control signal to an actuator 84 that is a control target.

The memory 102 is provided with a storage area for storing an embedded database 102b and a storage area for storing a control program 102c. The embedded database 102b is a database that collects and stores data pertaining to controlled objects. In one or more embodiments, a time series database is employed as an example. The time series database is a database designed in readiness to respond to queries including designation of a period, and can be used as an embedded database of the PLC 100.

The memory 102 is, for example, a storage element such as a RAM (Random Access Memory) or a ROM (Read Only Memory) or a storage device such as an HDD (Hard Disk Drive). In addition, a semiconductor memory such as a flash memory or SDRAM (Synchronous Dynamic RAM) or a nonvolatile memory such as an EPROM (Erasable Programmable ROM) or EEPROM (Electrically Erasable Programmable ROM) may be used.

The processor 101 is provided with a query creation unit 101a, a query parser 101b, a transmission unit 101c, a return unit 101d, a coupling unit 101e, and an accuracy setting unit 101f as processing functions according to one or more embodiments. These constituent elements are processing functions that are realized by computational processing that is executed by a CPU in accordance with the control program 102c, for example.

The query creation unit 101a creates a common query, triggered by a command that is given by the data mining tool 201 of the PC 200, for example. In other words, the query creation unit 101a creates a common query when an operation for coupling a plurality of databases is executed by a user from an operation window of the data mining tool 201 (FIG. 3). The accuracy of time stamps is designated by the user at the time of this operation. The created common query includes an item for designating this accuracy of the time stamps. The accuracy of a time stamp is a numerical value indicating digits after the decimal point of the time stamp, for example, and is represented in units such as milliseconds or microseconds, for example.

The query parser 101b analyzes the common query, and creates a query (first individual query) addressed to the embedded database 102b and a query (second individual query) addressed to another database that is targeted for table coupling. The respective queries originating in a common query and created for each database will be referred to as individual queries.

In one or more embodiments, the common query is created using standard SQL syntax, for example. The individual queries are created based on grammar that can be interpreted by the databases, according to languages (dialects) for the respective databases. For this purpose, a correspondence table or the like of standard SQL languages and non-standard languages may be stored in a query parser. Note that although MySQL, NoSQL and the like are able to perform queries using SQL syntax, each has a unique representational form at the present point in time.

The transmission unit 101c transmits the created individual queries to the databases to which each is addressed.

The return unit 101d, in the case where an inquiry by individual query is received from outside, for example, reads out a table that includes data corresponding to this individual query from the database 102b, and returns the read table to the inquiry source.

The coupling unit 101e processes the time stamps of data that are included in the plurality of tables returned from the databases serving as transmission destinations of the individual queries on a basis of the accuracy designated by the common query, and couples the plurality of tables (data). The accuracy setting unit 101f sets the accuracy of the time stamps based on the time stamps of the data included in the plurality of returned tables.

Figure 6:
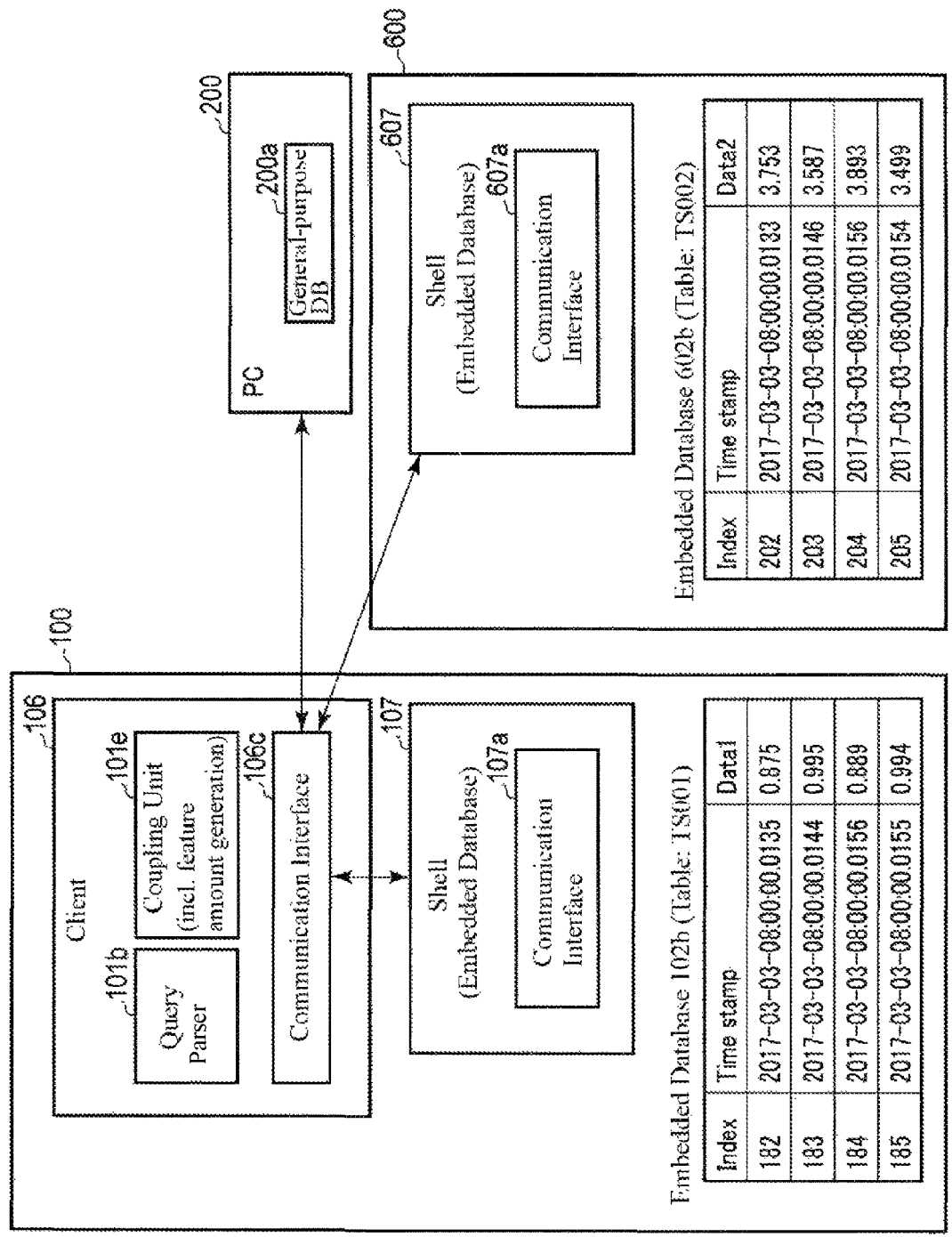
FIG. 6 is a diagram illustrating an example of functional blocks that are provided in PLCs.

FIG. 6 is a diagram showing an example of functional blocks that are provided in the PLC 100, the PLC 600 and the PC 200. The PLC 100 is provided with a client 106 and a shell 107 of the embedded database 102b. The shell 107 is an interface for when accessing the embedded database 102b, and is provided with a communication interface 107a. The communication interface 107a is a functional object that realizes the functions of the transmission unit 101c and the return unit 101d. Also, the client 106 is provided with the functional blocks of the query parser 101b and the coupling unit 101e, and with a communication interface 106c.

The PLC 600 is also likewise provided with an embedded database (given reference sign 602b), and is provided with a shell 607 that serves as an interface with this embedded database 602b, and with a communication interface 607a.

The PC 200 stores a general-purpose database (general-purpose DB) 200a that is represented by MySQL, NoSQL or the like, for example. The communication interface 106c of the client 106 of the PLC 100 acquires a table (table TS001) from the embedded database 102b, through interprocess communication that utilizes the shell 107 and a socket. Also, the communication interface 106c acquires a table (table TS002) from the embedded database 602b, through interprocess communication with the shell 607. Furthermore, the communication interface 106c acquires a table from the general-purpose database 200a, through interprocess communication with the PC 200. All of the tables also include a plurality of records that are distinguished by indices. Each record includes data and a time stamp assigned to the data. Next, operation in the above configuration will be described.

Figure 7:
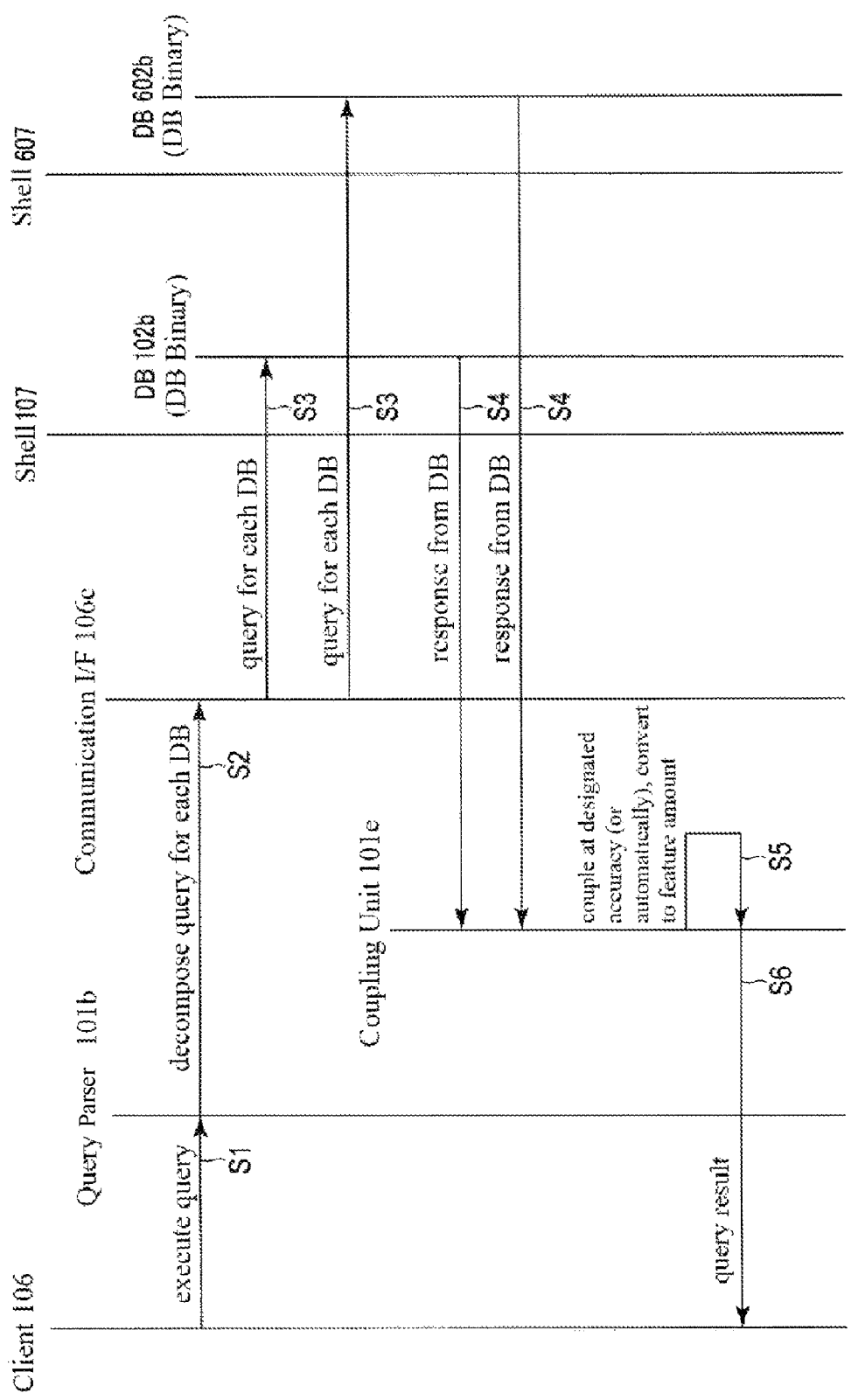
FIG. 7 is a sequence chart illustrating an example of a processing procedure according to one or more embodiments.

FIG. 7 is a sequence chart showing an example of a processing procedure according to one or more embodiments. In FIG. 7, when a query designating a desired extraction condition is executed by the client 106 (FIG. 6) (step S1), the query parser 101b decomposes the query for each database serving as a destination, and passes the resultant queries to the communication interface 106c (step S2).

Figure 8:
FIG. 8 is a diagram illustrating an example of a common query according to one or more embodiments.
Figure 8:

FIG. 8 is a diagram showing an example of a common query that is issued in step S1. This common query is written using SQL syntax, and EX-JOIN instructing table coupling and GROUP BY AVE indicating the basis for coupling are described. Furthermore, LEVEL indicating the accuracy of the time stamps is described. In one or more embodiments, the description "LEVEL=1#ms" indicates that millisecond accuracy is designated.

Figure 9:
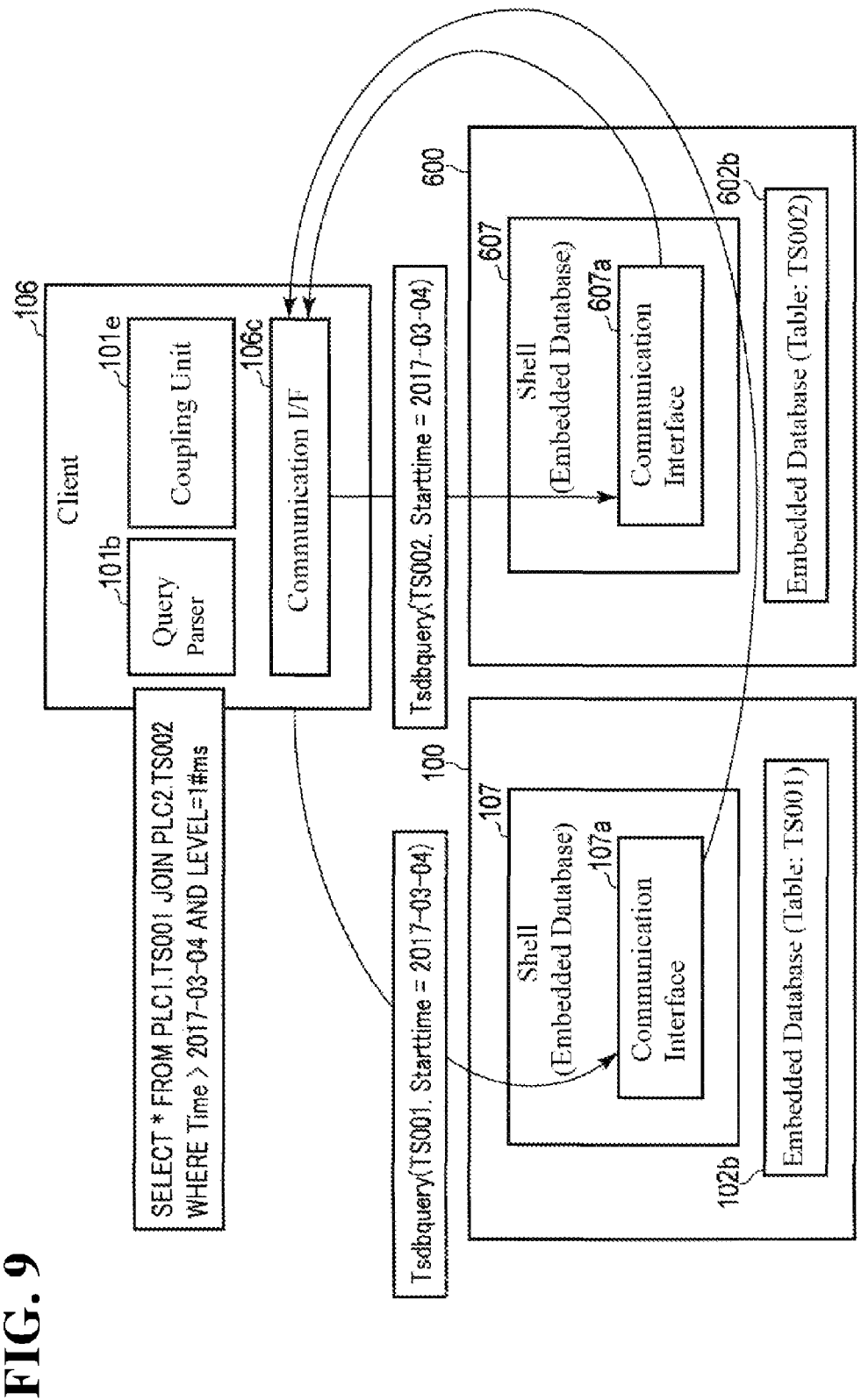
FIG. 9 is a schematic diagram illustrating an example of a data flow between functional blocks according to one or more embodiments.

The communication interface 106c transmits an individual query that is based on the common query for each of the databases (step S3). For example, as shown in FIG. 9, an individual query that includes TS001 and Starttime=2017-03-04 is transmitted to the embedded database 102b, and an individual query that includes TS002 and Starttime=2017-03-04 is transmitted to the embedded database 602b.

The shells 107 and 607, having received these individual queries, respectively extract data in line with the queries from the embedded databases 102b and 602b, and return tables that include data of the designated range to the query source (in response) (step S4 in FIG. 7).

The response from each database is passed to the coupling unit 101e via the communication interface 106c. The coupling unit 101e couples the plurality of received tables at the accuracy designated by the common query (step S5). Alternatively, the coupling unit 101e couples the plurality of tables, based on an accuracy calculated by the accuracy setting unit 101f. The coupled table is then passed to the client 106 as a response to the query (query result: query response) (step S6).

FIG. 10 is a diagram showing an example of a coupled table. In response to millisecond accuracy being designated by "LEVEL=1# ms" of the common query, the coupling unit 101e rounds down digits smaller than milliseconds of the respective time stamps of the tables TS001 and TS002, that is, digits that are four or more digits after the decimal point. For example, data of an index 182 of the table TS001 of FIG. 6 and data of an index 202 of the table TS002 are both coupled in association with the time stamp "2017-03-03-08: 00:00.013". In this way, in one or more embodiments, an item for designating the accuracy of the time stamps is provided in the query, and databases are coupled, with a time stamp within the accuracy designated by this query as a primary key. Data extracted from a plurality of time series databases can thereby be coupled at any accuracy desired by the user.

FIG. 11 is a diagram showing another example of the embedded database 102b (TS001). In FIG. 11, it is assumed that the collection cycle of data (or write cycle to the database) is twice as long, compared with the database shown in FIG. 6. In other words, the interval of the time stamps is twice as long, and the number of the records per unit of time is half compared with FIG. 6.

Next, coupling of an embedded database with a short data collection cycle and an embedded database with a long data collection cycle will be considered, with reference to the example in FIG. 11 and FIG. 12.

FIG. 12 is a diagram showing another example of a table extracted from an embedded database. It is assumed that the time stamp cycle of the embedded database 102b (TS001) in FIG. 11 is twice as long, whereas the time stamp cycle of the embedded database 602b (TS002) shown in (a) of FIG. 12 remains the same. This results in the data cycles lacking consistency between the databases.

In view of this, in one or more embodiments, the number of data is aligned with the table having the longer cycle, by taking the average value of data between a plurality of records, for example, as shown in (b) of FIG. 12. In other words, the coupling unit 101e couples a plurality of tables, after having converted data from the database including the larger number of records into an average value per unit of time. This reflects the fact that average value is designated by the description "GROUP BY AVE" in the common query shown in FIG. 8.

By adopting this configuration, the embedded database 602b (TS002) having the short data collection cycle can made consistent with the embedded database 102b (TS001) having the long data collection cycle. That is, it is also possible to deal with cases where the time stamp cycles differ between different databases. Accordingly, inconsistency in the number of data can be prevented at the time of table coupling.

FIG. 13 is a diagram showing another example of a common query according to one or more embodiments. In FIG. 13, the description "LEVEL=AUTO" is included. This indicates that the accuracy setting of the time stamps is left to whoever performs the processing for table coupling. Also, the fact that the average value is used when achieving consistency between the data cycles is indicated by "GROUP BY AVE". Average value is one example of a feature amount, and, additionally, a largest value, a smallest value and the like are also examples of feature amounts, and these values can be designated using the GROUP item of a query.

FIG. 14 is a diagram for illustrating processing by the accuracy setting unit 101f. The accuracy setting unit 101f, first, calculates the cycle between data of the tables that are to be coupled. For example, in the table TS001 of FIG. 14, the difference between the time stamps is derived for specific segments that are randomly extracted. The data recording cycle may vary due to the running of the manufacturing site, and such a situation can also be handled by employing random sampling.

For example, as shown in FIG. 14, assume that when groups of two consecutive records are randomly extracted in the table TS001, the values 1.03 ms, 1.01 ms and 2.09 ms, for example, are obtained as the difference between the time stamps of the records of each group. The accuracy setting unit 101f then calculates the accuracy of the time stamps for each of the groups, and employs the smallest accuracy as the accuracy to be set. For example, if at least 50% of the samples are 1 millisecond, an accuracy of 1 millisecond is set. In other words, in the example of FIG. 14, accuracy at or below the millisecond decimal point is rounded down, and an accuracy of 1 millisecond is employed by majority rule. In this way, the accuracy setting unit 101f sets the accuracy of the time stamps that are required at the time of table coupling ex post, so to speak, based on the time stamps of data that are included in the plurality of returned tables.

Note that there are cases where tables having different time stamp cycles are coupled, such as with the table TS001 and the table TS002. In this case, a feature amount (average value, largest value, smallest value, etc.) is calculated for the table having the shorter cycle (i.e., the table with the higher data recording frequency). Note that the feature amount, such as average value or largest value, is designated in the query.

For example, in the case where the cycle of TS001 is calculated as 1 millisecond and the cycle of TS002 is calculated as 2 milliseconds, the feature amount is calculated for TS001. In other words, the feature amount for the table having the shorter cycle is acquired, with the cycle of the table having the longer cycle as the units thereof.

As described above, in one or more embodiments, an item (LEVEL) for designating the accuracy of the time stamps is added to the inquiry syntax (SQL syntax) of the query. At the time of table coupling, a query designating the desired accuracy in LEVEL is transmitted. This query is analyzed by the query parser 101b, and a query is created and transmitted for each database that is targeted for inquiry. When coupling the acquired tables, the number of digits of the time stamps is then adjusted to be the same in accordance with the designated accuracy, and the tables are coupled in chronological order of the time stamps.

Adopting this configuration enables data extracted from a plurality of time series databases to be coupled at any accuracy desired by the user. Also, when coupling databases having different write cycles, the data of the database having the shorter time stamp cycle is converted into a feature amount (average value, largest value, smallest value, etc.), in conformity with the database having the longer time stamp cycle. Accordingly, records having a short cycle can be appropriately collected.

Given the above, it becomes possible to provide a control system, a control device, a coupling method and a computer program that are capable of coupling a plurality of databases after aligning the time stamp cycles of the data of the databases.

Various knowledge can be obtained, if data stored in a plurality of PLCs of a control system are coupled and the coupled data is analyzed using a so-called data mining technique. Furthermore, by combining and analyzing tables acquired from various other databases, it is possible to reduce defect events originating in production devices as much as possible. The above one or more embodiments are particularly useful in such applications.

Note that this invention is not limited to the above one or more embodiments. For example, a computer program of the PLCs 100 and 600 according to one or more embodiments can also be recorded to a recording medium or provided via a network. Some of the functional blocks of the PLC 100 can also be implemented in the PC 200 or the PLC 600.

Also, in order to adjust the number of digits of the time stamps to be the same, a configuration may be adopted in which the digits of the time stamps are rounded up to digits of the designated accuracy. Also, in one or more embodiments, the average value of data between records is taken as the feature amount, at the time of processing for table coupling between databases having different time stamp cycles. In addition, consistency between databases can be similarly achieved by converting data from one of the databases into either the largest value or the smallest value of data between records.

Also, in one or more embodiments, a form is disclosed in which the database having a larger number of data per unit of time is aligned with the database having a smaller number of data. The opposite form to this is also conceivable. For example, it is conceivable for a database that includes data collected every 2 milliseconds and a database that includes data collected every 3 milliseconds to be coupled at an accuracy of 1 millisecond. In this case, data can be adjusted in an existing state to be the same length, every 6 milliseconds, which is the least common multiple of the data collection cycles of the databases. On the other hand, time stamps that do not have a least common multiple, that is, the odd number values of the database that includes data collected every 2 milliseconds, are coupled by interpolating with the immediately previous data.

The term "processor" that is used in relation to a computer can be understood to be a CPU or GPU (Graphics Processing Unit), or a circuit such as an ASIC (Application Specific Integrated Circuit), SPLD (Simple Programmable Logic Device), CPLD (Complex Programmable Logic Device) or FPGA.

The processor, by reading out and executing a computer program stored in the memory, realizes particular functions that are based on the computer program. A configuration can also be adopted in which, instead of a memory, the computer program is embedded directly within the circuitry of the processor. In this case, the processor realizes those functions by reading out and executing the computer program embedded within the circuitry.

Also, at least part of the control system of one or more embodiments may be constituted by a cloud server device. That is, at least some of the functions that are realized by the control system of one or more embodiments may be executed by cloud computing.

Cloud computing may include at least one of SaaS (Software as a Service) that provides applications (software) as a service, PaaS (Platform as a Service) that provides a base (platform) for running applications as a service, and IaaS (Infrastructure as a Service) that provides resources such as a server device, a central processing unit and storage as a service (public cloud). For example, this cloud computing may include remote operation via the Internet, using a cloud service provision layer (PaaS).

In addition, with regard to the form of the system, the protocols of the network, the technique for installing computer programs, the type (target values, result values, etc.) of data that is acquired, the type and format of databases, the grammar for query syntax, and the functions, processing procedures and processing contents of PLCs, it is possible to implement various modifications without departing from the spirit of this invention.

In short, this invention is not strictly limited to one or more embodiments as described above, and constituent elements can be embodied through modification at the implementation stage without departing from the spirit of the invention. Also, various inventions can be formed by appropriately combining a plurality of the constituent elements that are disclosed in the above one or more embodiments. For example, some of the constituent elements may be omitted from the total number of constituent elements that are shown in one or more embodiments. Furthermore, constituent elements spanning different embodiments may be appropriately combined.

The above one or more embodiments can also be partially or wholly described as in the following supplementary remarks, but is not limited thereto.

Supplementary Remark 1

A control device including an embedded database configured to store data to which a time stamp is assigned and a processor, the processor:

creates a common query that includes an item for designating an accuracy of a time stamp, analyzes the common query and creates individual queries respectively addressed to the embedded database and another database that is different from the embedded database, transmits the created individual queries to the respective databases to which the individual queries are addressed, and processes at least one of time stamps of data returned from the respective databases in response to the transmitted individual queries, based on the accuracy designated by the common query, and couples the data returned from the respective databases.

Supplementary Remark 2

A coupling method including:

creating a common query that includes an item for designating an accuracy of a time stamp, using at least one processor;

analyzing the common query and creating individual queries respectively addressed to a plurality of databases configured to store data to which a time stamp is assigned, using at least one processor;

transmitting the created individual queries to the respective databases to which the individual queries are addressed, using at least one processor;

processing at least one of time stamps of data returned from the respective databases in response to the transmitted individual queries, based on the accuracy designated by the common query, using at least one processor; and coupling the data whose time stamp was processed, using at least one processor.

The invention claimed is:

1. A control system comprising:

a first database configured to store records, each record comprising data and a time stamp; and a control device comprising:
- a second database configured to store records, each record comprising data and a time stamp; and
- a processor configured with a program to perform operations comprising:
  - operation as a creation unit configured to create a common query comprising a designated time range for retrieving records from the first database and the second database having time stamps within the designated time range, and a designated time stamp accuracy value;
  - operation as a query parser configured to analyze the common query and create: a first individual query addressed to the first database; and a second individual query addressed to the second database;
  - operation as a transmission unit configured to transmit the first individual query to the first database and the second individual query to the second database; and
  - operation as a coupling unit configured to generate a coupled table comprising records in which data of records returned from the first database within the designated time range and data of records returned from the second database within the designated time range are coupled, each record of the coupled table comprising a common time stamp of the designated time stamp accuracy value, wherein at least one of: time stamps of the records returned from the first database in response to the first individual query; and time stamps of the records returned from the second database in response to the second individual query are processed based on the designated time stamp accuracy value of the common query.

2. The control system according to claim 1, wherein the designated time stamp accuracy value comprises a number of digits away from a decimal point; and
the processor is configured with the program such that operation as the coupling unit comprises rounding down or rounding up a number of digits of the time stamps of the records returned from the first database and the time stamps of the records returned from the second database, based on a distance from the decimal point as compared to the designated time stamp accuracy value.

3. The control system according to claim 1,
wherein the processor is configured with the program such that operation as the coupling unit comprises:
converting the records returned from one of the first database and the second database, whichever returns the largest number of records, into converted records comprising data having an average value per unit of time such that the number of the converted records equals the number of records returned from the other of the first database and the second database; and
coupling the converted records and the records returned from the other of the first database and the second database.

4. The control system according to claim 1,
wherein the processor is configured with the program such that operation as the coupling unit comprises:
converts converting the records returned from one of the first database and the second database, whichever returns the largest number of records, into converted records comprising data having one of a largest value and a smallest value within a unit of time such that the number of the converted records equals the number of records returned from the other of the first database and the second database; and
coupling the converted records and the records returned from the other of the first database and the second database.

5. The control system according to claim 1, wherein the processor is configured with the program to perform operations further comprising:
operation as a setting unit configured to set the designated time stamp accuracy value, based on the time stamps of the records returned from the first database and the time stamps of the records returned from the second database,
wherein the processor is configured with the program such that operation as the coupling unit comprises generating the coupled table based on the designated time stamp accuracy value set by the setting unit.

6. A control device applicable to a control system comprising a first database configured to store records, each record comprising data and a time stamp and a second database configured to store records, each record comprising data and a time stamp, the control device comprising a processor configured with a program to perform operations comprising:
operation as a creation unit configured to create a common query comprising a designated time range for retrieving records from the first database and the second database having time stamps within the designated time range, and a designated time stamp accuracy value;
operation as a query parser configured to analyze the common query and create: a first individual query addressed to the first database; and a second individual query addressed to the second database;
operation as a transmission unit configured to transmit the first individual query to the first database and the second individual query to the second database; and
operation as a coupling unit configured to generate a coupled table comprising records in which data of records returned from the first database within the designated time range and data of records returned from the second database within the designated time range are coupled, each record of the coupled table comprising a common time stamp of the designated time stamp accuracy value, wherein
at least one of: time stamps of the records returned from the first database in response to the first individual query; and time stamps of the records returned from the second database in response to the second individual query are processed based on the designated time stamp accuracy value of the common query.

7. The control device according to claim 6, wherein the designated time stamp accuracy value comprises a number of digits away from a decimal point; and
the processor is configured with the program such that operation as the coupling unit comprises rounding down or rounding up a number of digits of the time stamps of the records returned from the first database and the time stamps of the records returned from the second database based on a distance from the decimal point as compared to the designated time stamp accuracy value.

8. The control device according to claim 6,
wherein the processor is configured with the program such that operation as the coupling unit comprises
converting the records returned from one of the first database and the second database, whichever returns the largest number of records, into converted records comprising data having an average value per unit of time such that the number of the converted records equals the number of records returned from the other of the first database and the second database; and coupling the converted records and the records returned from the other of the first database and the second database.

9. The control device according to claim 6, wherein the processor is configured with the program such that operation as the coupling unit comprises:

converting the records returned from one of the first database and the second database, whichever returns the largest number of records, into converted records comprising data having one of a largest value and a smallest value within a unit of time such that the number of the converted records equals the number of records returned from the other of the first database and the second database; and coupling the converted records and the records returned from the other of the first database and the second database.

10. The control device according to claim 6, wherein the processor is configured with the program to perform operations further comprising:

operation as a setting unit configured to set the designated time stamp accuracy value, based on the time stamps of the records returned from the first database and the time stamps of the records returned from the second database, wherein the processor is configured with the program such that operation as the coupling unit comprises generating the coupled table based on the designated time stamp accuracy value set by the setting unit.

11. A coupling method that is executed by a control device applicable to a control system comprising a first database configured to store records, each record comprising data and a time stamp, and a second database configured to store records, each record comprising data and a time stamp, the coupling method comprising:

creating a common query comprising a designated time range, for retrieving records from the first database and the second database having time stamps within the designated time range, and a designated time stamp accuracy value;

analyzing the common query and creating a first individual query addressed to the first database and a second individual query addressed to the second database;

transmitting the first individual query to the first database and the second individual query to the second database; and generating a coupled table comprising records in which data of records returned from the first database within the designated time range and data of records returned from the second database within the designated time range are coupled, each record of the coupled table comprising a common time stamp of the designated time stamp accuracy value, wherein at least one of: time stamps of the records returned from the first database in response to the first individual query; and time stamps of the records returned from the second database in response to the second individual query are processed based on the designated time stamp accuracy value of the common query.

12. The method according to claim 11, wherein the designated time stamp accuracy value comprises a number of digits away from a decimal point; and generating the coupled table comprises rounding down or rounding up a number of digits of the time stamps of the records returned from the first database and the time stamps of the records returned from the second database, based on a distance from the decimal point as compared to the designated time stamp accuracy value.

13. The method according to claim 11, wherein generating the coupled table comprises converting the records returned from one of the first database and the second database, whichever returns the largest number of records, into converted records comprising data having an average value per unit of time such that the number of the converted records equals the number of records returned from the other of the first database and the second database; and coupling the converted records and the records returned from the other of the first database and the second database.

14. The method according to claim 11, wherein generating the coupled table comprises converting the records returned from one of the first database and the second database, whichever returns the largest number of records, into converted records comprising data having one of a largest value and a smallest value within a unit of time such that the number of the converted records equals the number of records returned from the other of the first database and the second database; and coupling the converted records and the records returned from the other of the first database and the second database.

15. The method according to claim 11, further comprising setting the designated time stamp accuracy value based on the time stamps of the records returned from the first database and the time stamps of the records returned from the second database.

16. A non-transitory computer-readable storage medium storing a computer program for causing a computer provided in a control device applicable to a control system comprising a first database configured to store records, each record comprising data and a time stamp, and a second database configured to store records, each record comprising data and a time stamp, to perform operations comprising:

creating a common query comprising a designated time range, for retrieving records from the first database and the second database having time stamps within the designated time range, and a designated time stamp accuracy value;

analyzing the common query and creating a first individual query addressed to the first database and a second individual query addressed to the second database;

transmitting the first individual query to the first database and the second individual query to the second database; and generating a coupled table comprising records in which data of records returned from the first database within the designated time range and data of records returned from the second database within the designated time range are coupled, each record of the coupled table comprising a common time stamp of the designated time stamp accuracy value, wherein at least one of: time stamps of the records returned from the first database in response to the first individual query; and time stamps of the records returned from the second database in response to the second individual query, are processed based on the designated time stamp accuracy value of the common query.

* * * * *